United States Patent [19]

Covington et al.

[11] Patent Number: 4,780,784

[45] Date of Patent: Oct. 25, 1988

[54] RECORD DISK CARTRIDGE-SHUTTER COMBINATION

[75] Inventors: Roger G. Covington, Rochester; Clark E. Harris, Fairport, both of N.Y.

[73] Assignee: Eastman Kodak Company, Rochester, N.Y.

[21] Appl. No.: 64,154

[22] Filed: Jun. 19, 1987

Related U.S. Application Data

[63] Continuation-in-part of Ser. No. 799,511, Nov. 19, 1985, abandoned.

[51] Int. Cl.$^4$ .......................................... G11B 23/033
[52] U.S. Cl. .................................................. 360/133
[58] Field of Search ........................ 360/133; 206/444

[56] References Cited

U.S. PATENT DOCUMENTS 4,120,012 10/1978 Bowers ............................... 360/133
4,131,199 12/1978 Hatchett et al. .................... 360/133

FOREIGN PATENT DOCUMENTS

58-17573 2/1983 Japan ................................. 360/133

Primary Examiner—Robert S. Tupper
Attorney, Agent, or Firm—William C. Dixon

[57] ABSTRACT

A record disk cartridge (34) is disclosed for use in a disk drive unit wherein the cartridge has a compartment containing a record disk (10) therein. The cartridge (34) has aperture means (42) (44) for insertion therethrough of a transducer head of the disk drive unit and through which the record disk can be engaged for rotation. A shutter mechanism (46) (48) associated with the aperture means is movable between an aperture-closed position at least partially closing the aperture means, and an aperture-opened position opening the aperture means. The shutter mechanism is biased by a spring (52) toward its aperture-closed position. An abutment member (54) of the disk drive unit enters into the cartridge to a position within the outer circumference of the record disk when the cartridge is moved to its recording position. The abutment member engages surface means (56) (58) (59) (61) on a shutter blade (48) of the shutter mechanism to move the shutter mechanism from its aperture-closed position to its aperture-opened position as the cartridge is moved to its recording position. The tensioned spring (52) of the shutter mechanism holds the shutter mechanism in its aperture-opened position and the cartridge in its recording position.

10 Claims, 6 Drawing Sheets

RECORD DISK CARTRIDGE-SHUTTER COMBINATION

RELATED APPLICATION

This application is a continuation-in-part of application Ser. No. 799,511 filed on Nov. 19, 1985 now abandoned.

FIELD OF THE INVENTION

The present invention relates generally to record disk cartridges for information storage and retrieval, and more particularly to such cartridges having improved means for protecting one or more recording surfaces of a record disk from dust and other contaminants.

DESCRIPTION OF THE PRIOR ART

Record disks have been used for many years to store information for use in various types of devices, such as for example word processors and computer systems. In many cases, such disks are carried in rigid or semi-rigid cartridges to protect the record disk from physical damage and from dust, fingerprints, and other contaminants. An inner enclosure or liner may also be provided to afford further protection against contamination and abrasion of the disk. In such a disk cartridge, at least one pair of registering apertures is provided in the enclosure and cartridge through which a read and/or write head can be received so that the record disk need not be removed from the cartridge and enclosure during use. When using such a cartridge, however, dust as well as other contaminants can reach the record disk surface through the apertures. To inhibit this, an openable shutter is sometimes provided, as shown in U.S. Pat. Nos. 3,593,327; 4,120,012; 4,131,199; 4,471,397 and Japanese Pat. No. 58-17573.

In the type of construction to which the present invention is directed, the shutter is normally spring loaded to its closed position and is opened by the act of moving the cartridge endwise into a disk drive unit in which it is to be used. Because the force required to open the shutter is derived from the endwise cartridge movement, and tends to resist insertion, the maximum force required will be inversely related to the distance through which the cartridge moves endwise while effecting the shutter opening operation. In the construction shown in U.S. Pat. No. 4,131,199, for example, the actuating element of the shutter blade is engaged near the center of the inserted end of the cartridge by a fixed abutment member in the machine. However, to prevent the abutment member from damaging the disk, the former does not enter the region of the cartridge occupied by the disk, thus severely limiting its effective movement of the actuating element and requiring a correspondingly high insertion force.

Alternatively, to reduce the insertion force, some prior art cartridges include an internal linkage operable by an actuating member that is movable along a substantial portion of one edge of the cartridge, beyond the region occupied by the shutter. This type of construction obviously entails substantial complication of the cartridge construction and, because the resisting force is along one edge, also tends to cause the cartridge to cock or rotate when it is inserted in the machine, because the resisting force is along one edge. This is particularly significant in the case of a relatively small cartridge intended to be loaded with one hand.

Japanese Pat. No. 58-17573 discloses a cartridge in FIGS. 5 and 6 in which the insertion force required to open the shutter is reduced. However, other problems are presented by such a cartridge design, such as damage possibly occurring to the disk surface due to scratching or dirt applied to the disk surface by an abutment member as it passes over the exposed surface of the disk in the head aperture. Also, the abutment member conceivably could engage an inner peripheral edge of the disk center hole as it passes thereover possibly inflicting damage to the disk, or altering its center position relative to a disk drive unit so that disk reading/recording is adversely affected.

When a cartridge of the aforementioned type having an openable shutter is inserted into a disk drive unit to its recording position, the shutter machanism is moved to its open position and retained therein against the bias of the shutter spring. The tensioned shutter spring presents a problem in that the force generated thereby continuously acts to force the cartridge out of its recording position. To overcome this problem, the prior known disk drive units were provided with means, such as latch means, for holding the cartridge in its recording position against the force generated by the tensioned shutter spring. The improved cartridge of this invention overcomes this problem by utilizing the tensioned force of the shutter spring to latch the cartridge in its recording position, thereby completely eliminating the need for means in the disk drive unit for holding the cartridge in its recording position.

SUMMARY OF THE INVENTION

An object of the present invention is to provide an improved record disk cartridge of simple design and construction having a shuttered aperture and a shutter opening mechanism that is reliable and economical to manufacture, while at the same time improving the ease with which it can be loaded into a disk recorder, disk player or similar disk drive unit.

A preferred embodiment of the present invention includes a record disk cartridge for use in a disk drive unit wherein the cartridge has a record disk mounted therein. The cartridge has aperture means for receiving a transducer head of the disk drive unit and through which the record disk can be engaged for rotation. A shutter mechanism associated with the aperture means is movable between an aperture-closed position, at least partially closing the aperture means, and an aperture-opened position opening the aperture means, and is normally biased toward its aperture-closed position. An abutment member of the disk drive unit enters into the cartridge along a path extending parallel to the side edges of the cartridge from the central portion of its insertion end almost to the central cartridge opening through which the disk is engaged by the drive unit for imparting rotation to the disk. A liner member, enclosed within the cartridge, is interposed between the slot and the disk, thereby protecting the disk from the abutment member. Consequently, the disk face can move with the cartridge adjacent the abutment member without being damaged thereof and can thus have a relatively long effective travel to minimize the resisting force created by opening the shutter and overpowering its biasing spring. Furthermore, surface means of the shutter member are designed to cooperate with the abutment member in the disk drive in such a way as to move the shutter to its aperture-opened position, thus allowing access to the record disk. Also, the biasing effect of the shutter spring holds the shutter in its aperture-opened position, and the cartridge in its recording position without the need of cartridge holding means in the disk drive unit.

BRIEF DESCRIPTION OF THE DRAWINGS

The invention will be described with respect to the drawings, wherein.

DETAILED DESCRIPTION OF THE PREFERRED EMBODIMENT

Because record disk cartridges and disk drive units used therewith are well known, the present description will be directed in particular to elements forming part of, or cooperating directly with, apparatus in accordance with the present invention. It is to be understood that elements not specifically shown or described may take various forms well known to those skilled in the art.

Figure 1:
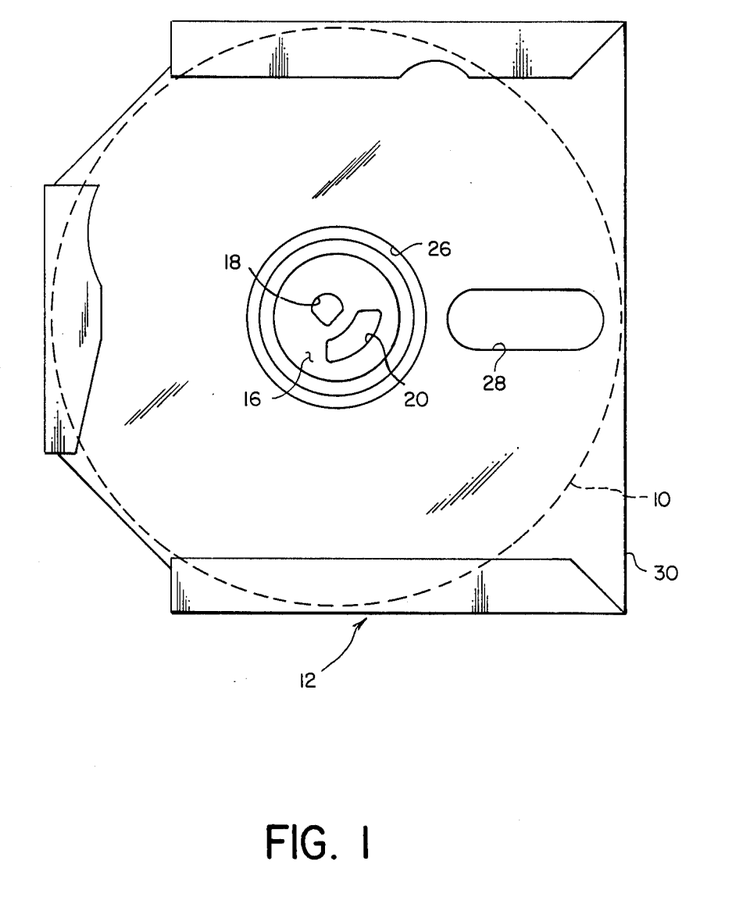
FIG. 1 is a top plan view of the record disk and liner portion of the record disk cartridge in accordance with the present invention.
Figure 2:
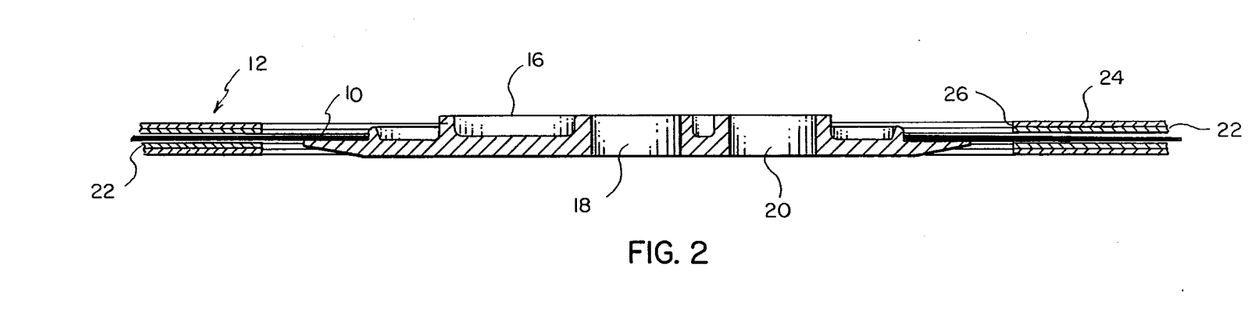
FIG. 2 is a side sectional view of a portion of the record disk and liner shown in FIG. 1.

FIGS. 1 and 2 show a record disk 10 and a jacket/liner 12 in which the record disk is sealed. For purposes of illustration, the record disk is shown as a magnetic floppy disk, but other types of recording media may be used in accordance with the present invention. Disk 10 has a circular aperture which is concentric with the outer circumference of the disk. A central hub 16 is located within the aperture and has centering and drive features 18 and 20 for engagement by a disk drive unit.

Liner 12, into which record disk 10 is inserted and sealed, is formed from a sheet of material fabricated by bonding a liner of porous, fibrous, low-friction, antistatic material 22, to a layer 24 of solid, outer material. The liner has a circular aperture 26 located at its center and generally coaxially with hub 16 of record disk 10, although the record disk is somewhat movable within the liner. An oval magnetic head aperture 28 is located symmetrically along a line from the center of circular aperture 26 orthogonal to a side 30 of the liner. Similar apertures may be provided on the other liner wall and aligned with apertures 26 and 28.

By placing record disk 10 into a protective member such as liner 12, handling operations before final assembly are facilitated. Liner 12 also provides a protective barrier between the cartridge shutter mechanism and the fragile record disk, as will become apparent later in this specification.

Figure 3:
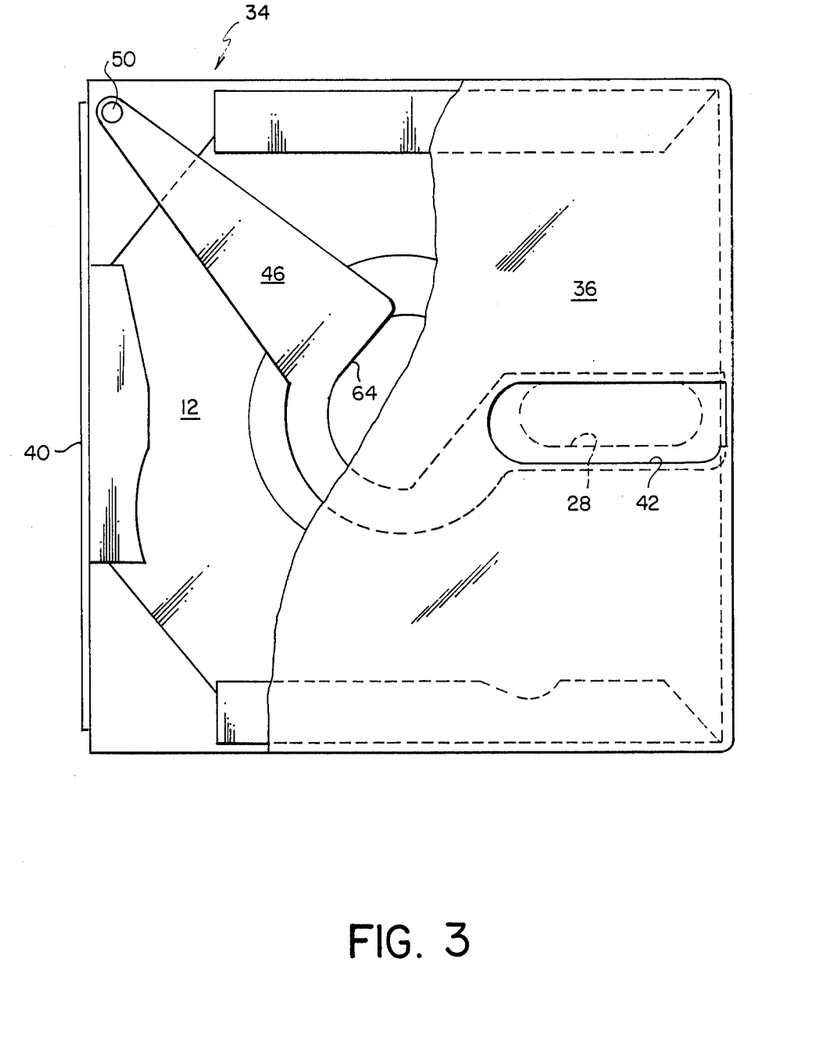
FIG. 3 is a top plan view of a record disk cartridge in accordance with the present invention with the shutter mechanism in its aperture-closed position.
Figure 4:
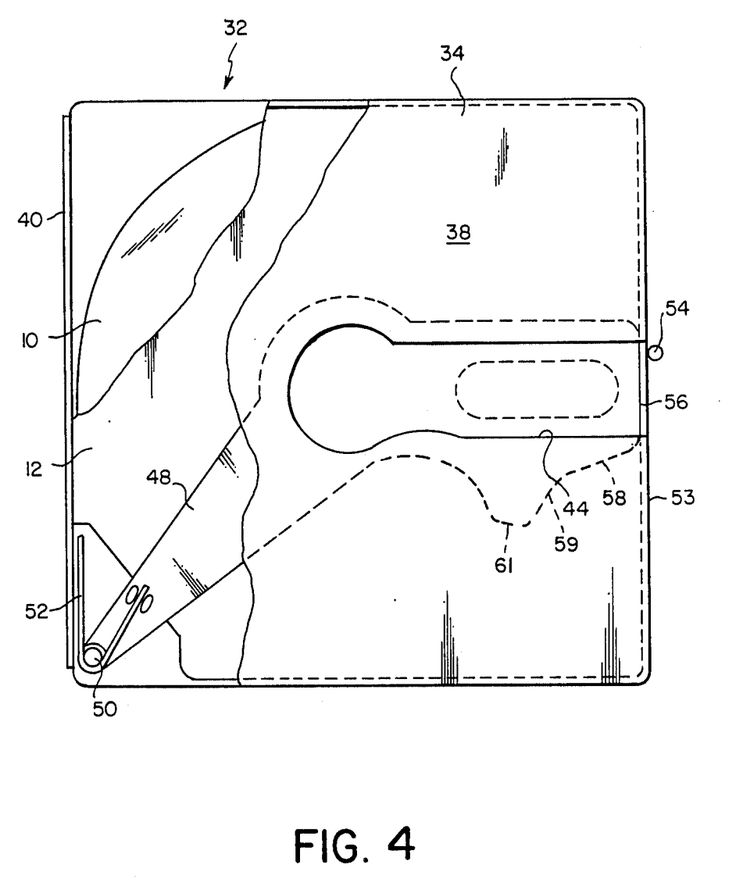
FIG. 4 is a bottom plan view of the record disk cartridge as shown in FIG. 3 with the shutter mechanism in its aperture-closed position.

Referring to FIGS. 3 and 4, a record disk cartridge 34 is shown in top and bottom views, respectively. The disk cartridge 34 comprises a record disk and liner combination, as described above with reference to FIGS. 1 and 2. The cartridge is formed of top and bottom panel walls 36 and 38, respectively, which are hingably connected at edge 40. The panel walls 36 and 38 have peripheral lips which when joined together form a compartment for the record disk 10.

Top and bottom panel walls 36 and 38 are preferably formed of rigid molded material to protect record disk 10 therein. Once loaded and closed, the panel walls can be sealed together such as by adhesive or ultrasonic bonding to prevent removal of the record disk and liner.

Top and bottom panel walls 36 and 38 include aperture means for insertion therethrough of a transducer head of a disk drive unit and through which record disk 10 can be rotated by the drive member of such a disk drive unit. The aperture means includes an opening 42 in top half 36 and an opening 44 in bottom half 38. Openings 42 and 44 are aligned with oval apertures 28 in liner 12, whereby access is provided to the record disk through the openings and those apertures. Further, opening 44 in bottom half 38 is enlarged to align with hub 16 of the record disk so that centering and drive features 18 and 20 can be engaged by the drive member of a disk drive unit.

A shutter mechanism is provided for closing off openings 42 and 44 to protect the record disk from physical damage from dust, fingerprints, and other contaminants. The shutter mechanism includes top and bottom shutter blades 46 and 48, respectively, which are joined at a pin 50 for simultaneous rotation about the axis of the pin. The shutter mechanism is urged toward an aperture-closed position, as shown in FIGS. 3 and 4, by a torsion spring 52 shown in FIG. 4. In that position, the shutter mechanism underlies openings 42 and 44 to protect the record disk and to inhibit insertion through the openings of foreign objects.

Referring now to FIGS. 4-6 and 9, it can be seen that opening 44 in bottom panel wall 38 extends to the peripheral edge 53 of the cartridge (FIG. 8) which is opposite hinged edge 40. This permits entry into opening 44 of an abutment member 54 fixedly mounted on a plate 51 (FIG. 9) of a disk drive unit, not shown, as the record disk cartridge is loaded into the disk drive unit. The abutment member 54 comprises a pin 55 fixed to the disk drive unit and having an enlarged head 60 to prevent the bottom shutter blade 48 from riding over the top of the abutment member. The abutment member enters opening 44 along a path parallel to, and on one side of a diametrical chord D—D (see FIG. 5) passing through the centers of record disk 10 and openings 42 and 44. The path of abutment member 54 relative to the cartridge as it is moved to its recording position is on one side of the diametrical chord D—D, which is on the opposite side from pin 50 about which top and bottom shutter blades 56 and 58 rotate.

Figure 5:
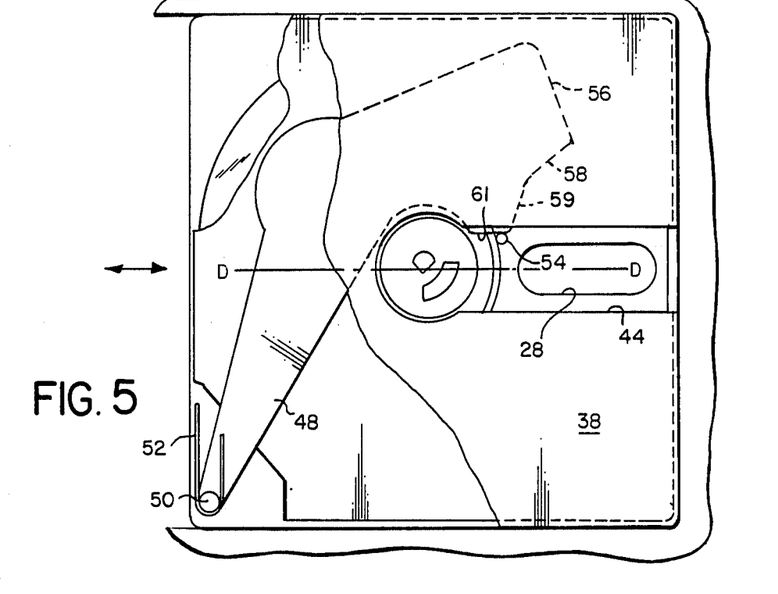
FIG. 5 is a view similar to FIG. 4 with the shutter mechanism in its aperture-opened position, and further showing the cartridge in its recording position.

As abutment member 54 enters opening 44, it initially engages a first surface 56 of surface means associated with the shutter mechanism. Further movement of the abutment member into the cartridge to a position within the cylindrical projection of the outer circumference of record disk 10 is effective to move the shutter mechanism from its aperture-closed position to its aperture-opened position. The surface means associated with the shutter mechanism, as best seen in FIG. 5, comprises first and second substantially orthogonal surfaces 56 and 58, respectively, of bottom shutter blade 48. First surface 56 is substantially perpendicular to a radius of record disk 10 as best seen in FIG. 4. The surface means further includes a third nose surface 59 merging with surface 58 and terminating in a fourth base surface 61 which extends in a generally radial direction of the disk.

Figure 6:
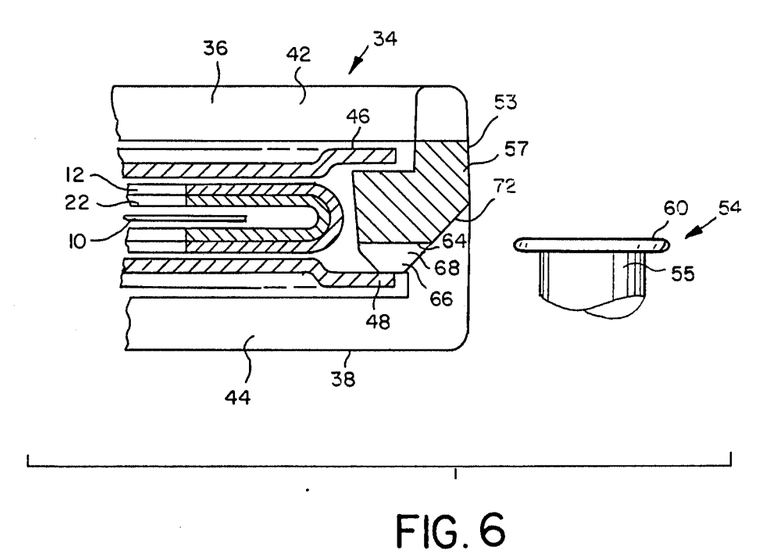
FIG. 6 is an enlarged segmental side sectional view of an edge portion of the record disk cartridge shown in FIG. 4.
Figures 8, 9:
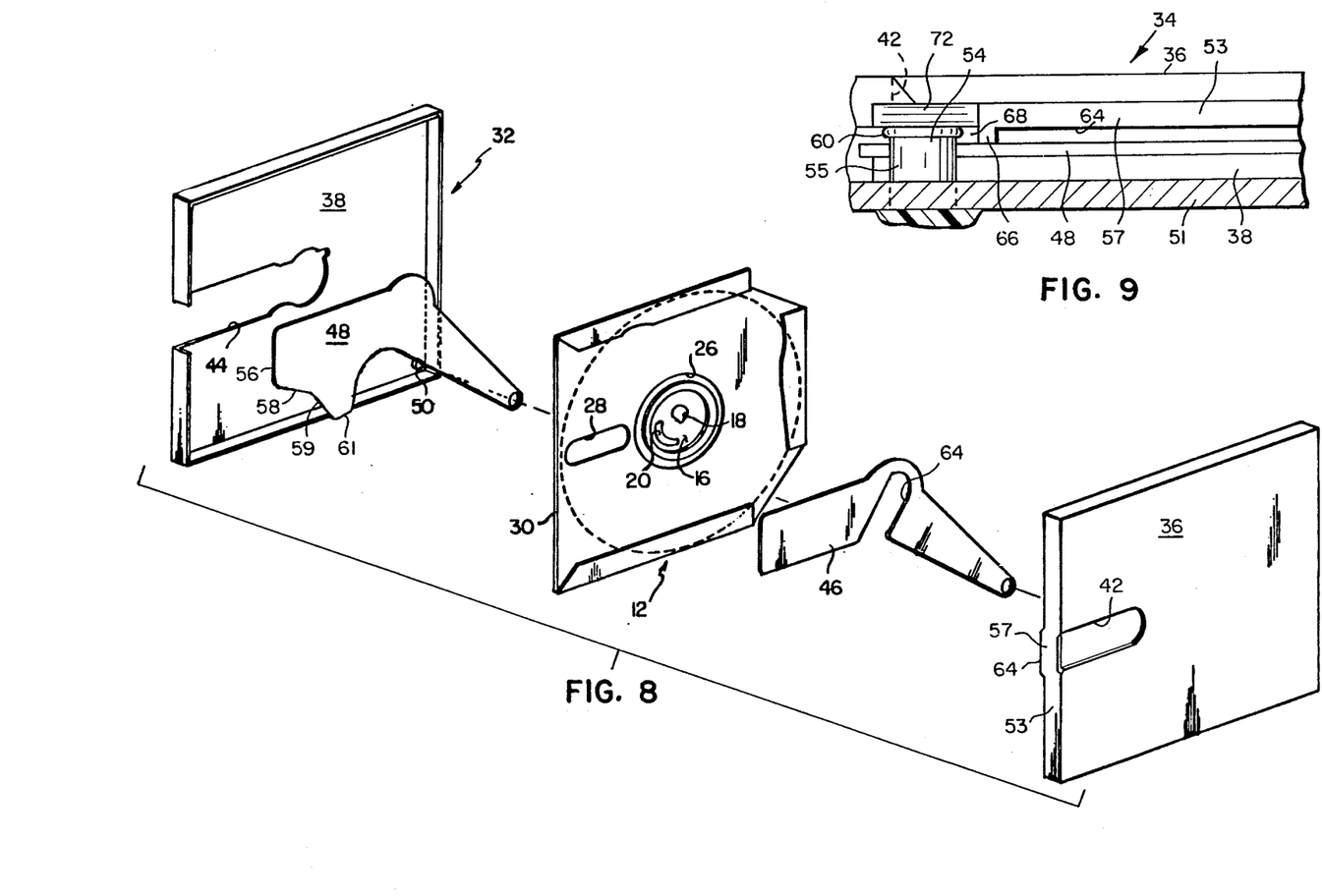
FIG. 8 is an exploded perspective view of the record disk cartridge shown in FIG. 4.
FIG. 9 is a segmental right-end elevational view of the cartridge of FIG. 6.

With specific reference to FIGS. 6, 8 and 9, a bridge 57 of front peripheral edge 53 of the top half 36 of the cartridge has a lower surface 64 provided with a depending pin 66 for engaging the upper surface of lower shutter blade 48. The pin 66 separates shutter blade 48 from surface 64 to form a gap 68 therebetween for receiving head 60 of abutment member 54. The gap 68 and head 60 cooperate to assure engagement of abutment member 54 with first surface 56 of shutter blade 48. Head 60 enters gap 68 upon inward movement of the cartridge and captures the shutter blade between head 60 and a stem 55 of abutment member 54 to prevent the shutter blade from riding over the top of the abutment member. Cartridge edge 53 further has a bevelled portion 72 to assist entry of head 60 into gap 68 in the event of some misalignment between gap 68 and head 60. Further movement of abutment member 54 into cartridge 34 upon movement of the cartridge to the position shown in FIG. 5 is effective to move shutter blades 46 and 48, which are secured together, to their aperture-opened position.

Movement of abutment member 54 into cartridge 34 causes bottom shutter blade 48 to rotate about the axis of pin 50 against the return force of spring 52 as abutment member 54 moves along surface means 56, 58, 59 and 61 of the shutter blade. Such movement continues until abutment member 54 has reached the position shown in FIG. 5, at which time the shutter blades are fully opened to provide access to the record disk and its hub. In this fully opened position, shutter spring 52 applies a biasing force to fixed abutment member 54 by base surface 61 in a direction generally perpendicular to the aforementioned diametrical chord D—D passing through the centers of record disk 10 and openings 42 and 44. This biasing force holds shutter blades 46 and 48 in their aperture-opened position, and acts as a braking force for cartridge 34 for holding it in its recording position. Since no effective component of the shutter biasing force in the fully opened position of the shutter blades is directed along diametrical chord D—D tending to eject the cartridge from its recording position, the prior known need for the provision of additional means for holding the cartridge in its recording position against the biasing force of the shutter spring is obviated.

Figure 7:
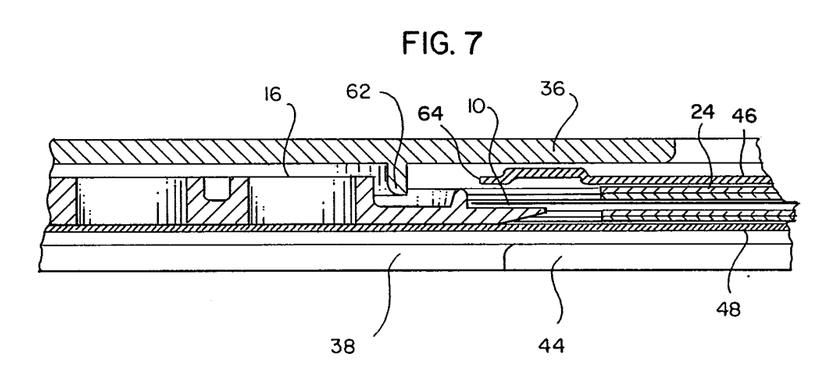
FIG. 7 is an enlarged segmental side sectional view of a central portion of the record disk cartridge shown in FIG. 4.

As can be seen in FIG. 7, top half 36 of enclosure 34 has a depending annular rib 62 which serves to center hub 16 of record disk 10 to inhibit lateral shifting of the record disk and to thereby prevent possible damage to the circumference thereof. Top shutter blade 46 has been provided with a recess 64 to accommodate annular rib 62 when the shutter blade is in its aperture-closed position.

The invention has been described in detail with particular reference to a preferred embodiment thereof, but it will be understood that variations and modifications can be effected within the spirit and scope of the invention.

We claim:

1. In a record disk cartridge-shutter combination for use in a disk drive unit having a transducer head, a drive member, and a fixed abutment member; wherein the record disk cartridge comprises a record disk mounted for rotation within the cartridge, aperture means in the cartridge for insertion therethrough of the transducer head of such a disk drive unit and through which the record disk in its recording position can be rotated by the drive member; the improvement wherein the record disk cartridge-shutter combination further comprises:

shutter means comprising a shutter blade for the aperture means mounted within the cartridge for movement of the shutter blade between an aperture-closed position at least partially closing the aperture means and an aperture-opened position opening the aperture means;

biasing means include a spring for urging the shutter blade toward its aperture-closed position; and surface means on the shutter blade for engaging the fixed abutment member of the disk drive unit upon movement of the cartridge to its recording position relative to the fixed abutment member for effectively moving the shutter blade from its aperture-closed position to its aperture-opened position, the surface means further having a portion thereof in engagement with the fixed abutment member when the cartridge reaches its recording position for positioning the shutter blade in its aperture-opened position and for holding the cartridge in its recording position under the bias of the shutter spring.

2. The record disk cartridge-shutter combination as defined in claim 1 wherein the surface means comprises first, second, third and fourth surfaces which are engaged in sequence by the fixed abutment member, the first and second surfaces being substantially orthogonal surfaces, the third surface being a nose surface, and the fourth surface being the portion which is arranged substantially parallel to the path of movement of the cartridge relative to the fixed abutment member as it moves the shutter blade into the aperture-opened position, whereby the fourth surface portion engages and applies a force to the fixed abutment member under the influence of the shutter spring.

3. The record disk cartridge-shutter combination as defined in claim 2 wherein the first surface is substantially perpendicular to a radius of the record disk when the shutter blade is in the aperture-closed position.

4. The record disk cartridge-shutter combination as defined in claim 3 wherein:

the fixed abutment member of the disk drive unit enters the cartridge upon movement of the cartridge relative to the abutment member along a first path parallel to and on one side of a predetermined diametrical chord of the record disk passing through the centers of the disk and aperture means; and the shutter means is supported for rotation about a second axis parallel to the axis of rotation of the record disk, the second axis being on the side of the diametrical chord opposite to the first path.

5. The record disk cartridge-shutter combination as defined in claim 1, and further comprising a liner enclosing the record disk, and wherein:

the aperture means includes registering apertures in the cartridge and liner on both sides of the record disk;

the shutter means includes (1) a pair of shutter blades mounted on opposed sides of the record disk between the liner and cartridge, and (2) connecting means interconnecting the shutter blades for common movement; and the surface means is associated with only one of the shutter blades, whereby the fixed abutment member entering into the cartridge on one side of the record disk upon movement of the cartridge relative to the abutment member will effect movement of both of the shutter blades to the aperture-opened position.

6. A record disk cartridge-shutter combination for use in a disk drive unit having a transducer head, a drive member and a fixed abutment member, the combination comprising:

two opposed, spaced apart panel walls cooperating with a peripheral wall for defining a compartment in which the record disk is mounted with at least one of the panel walls having aperture means extending outwardly from the compartment through the peripheral wall to define a narrow entranceway therein through which the abutment member can pass;

shutter means comprising a shutter blade and spring mounted within the compartment wherein the shutter blade is movable under the bias of the spring from an aperture-opened position opening the aperture means to an aperture-closed position closing the aperture means, the shutter blade having an end portion extending into the entrance-way when the shutter blade is in the aperture-closed position;

surface means on the shutter blade for engagement by the abutment member upon movement of the cartridge to its recording position for moving the shutter blade to its aperture-opened position; and means on the peripheral wall engagable with the shutter blade end portion for providing a gap between the shutter blade end portion and the peripheral wall to facilitate entry of the abutment member into the gap for engaging the shutter surface means for moving the shutter blade to the aperture-opened position.

7. A record disk cartridge-shutter combination according to claim 6 wherein the shutter blade end portion has an end surface which is substantially perpendicular to a radius of the record disk when the shutter blade is in its aperture-closed position, and the means on the peripheral wall for providing a gap comprises a pin depending from the peripheral wall into engagement with the shutter blade end portion when the shutter blade is in its aperture-closed position.

8. A record disk cartridge-shutter combination according to claim 7 wherein the surface means comprises first, second, third and fourth surfaces on the shutter blade which are engaged in sequence by the fixed abutment member upon movement of the cartridge to its recording position, the first surface is the shutter blade end surface and the first and second surfaces are substantially orthogonal surfaces.

9. A record disk cartridge-shutter combination according to claim 8 wherein the third surface is substantially nose-shaped, and the fourth surface is substantially parallel to the path of movement of the cartridge relative to the fixed abutment member when the shutter blade is in its aperture-opened position, whereby the fourth surface applies a force to the fixed abutment member under the bias of the shutter spring for holding the cartridge in its recording position.

10. A record disk cartridge-shutter combination according to claim 9, and further comprising a liner enclosing the record disk, and wherein:

the aperture means includes registering apertures in the cartridge and liner on both sides of the record disk;

the shutter means includes (1) a pair of shutter blades mounted on opposed sides of the record disk between the liner and cartridge and (2) means interconnecting the shutter blades for common movement; and the surface means if provided on only one of the shutter blades whereby an abutment member entering the cartridge on one side of the record disk upon movement of the cartridge to its recording position will effect movement of both of the shutter blades to the aperture-opened position.

* * * * *